Patented Apr. 22, 1947

2,419,347

UNITED STATES PATENT OFFICE 2,419,347

POLYMERIZATION CATALYSTS

Vernon L. Folt and Forrest W. Shaver, Akron, Ohio, assignors to The B. F. Goodrich Company, New York, N. Y., a corporation of New York No Drawing. Application March 13, 1944, Serial No. 526,323

8 Claims. (Cl. 260—88)

This invention relates to the polymerization of vinyl compounds and pertains more specifically to the polymerization of such compounds in aqueous emulsion in the presence of an alkoxybenzoyl peroxide catalyst.

It has previously been known that benzoyl peroxide and other peroxides are effective catalysts for the polymerization of vinyl compounds. We have now discovered that the introduction of one or more alkoxy groups into the benzene nucleus of benzoyl peroxide greatly increases the effectiveness of the compound as a catalyst for the polymerization of vinyl compounds in aqueous emulsion.

The monomers with which our new catalysts are effective include any unsaturated organic compounds which are capable of undergoing a true addition polymerization to form a high molecular weight linear polymer. Compounds which undergo such polymerization are well-known to the art, and in general contain a methylene group attached by an ethylenic double bond to a carbon atom. Compounds which undergo such polymerization most readily also usually have the carbon atom which is attached to the methylene group attached in turn to an electronegative group, such as a phenyl or vinyl group, a halogen atom, a group containing a

linkage or the like. Included in this class of monomers are the conjugated butadienes; for example butadiene-1,3 hydrocarbons such as butadiene-1,3, isoprene, 2,3-dimethylbutadiene-1,3 and piperylene and also substituted butadienes such as chloroprene and 2-cyanobutadiene-1,3. Also included are the aryl olefins such as styrene, vinyl naphthalene and alphachlorostyrene; acrylic and alpha-substituted acrylic acids, esters, nitriles and amides, such as acrylic acid, acrylonitrile, alpha-methacrylonitrile, methyl acrylate, ethyl acrylate, methyl ethacrylate, methacrylamide and the like; as well as vinyl esters, ethers, ketones and heterocyclic vinyl compounds such as vinyl chloride, vinyl acetate, vinyl propionate, vinyl butyrate, vinyl furane, methyl vinyl ketone, and the like; and such compounds as vinylidene chloride, methyl isopropenyl ketone, and the like. All of these monomers, as well as mixtures of two or more of them may be readily polymerized with our new alkoxybenzoyl peroxide catalyst; however, best results have been obtained by polymerizing, in aqueous emulsion, monomeric materials which consist predominantly of vinyl chloride, that is, vinyl chloride itself and mixtures of vinyl chloride with lesser proportions of other copolymerizable monomers such as vinyl bromide, vinylidene chloride, vinyl acetate, vinyl propionate, vinyl butyrate, methyl acrylate, methyl methacrylate, and the like.

The alkoxybenzoyl peroxides which we have found to be effective catalysts include any benzoyl peroxide having one or more alkoxy groups such as methoxy, ethoxy, propoxy, butoxy, and higher homologous groups directly attached to one or both benzene nuclei. However, we have found that best results are obtained when the alkoxy groups are in the ortho position. Although other electronegative groups such as halogen atoms, alkyl or hydroxy groups, and the like may be present in the benzene nucleus, it is important that no electropositive group such as nitro, aldehyde, sulfonic acid, or the like, be present because these latter groups have an inhibitory effect upon the polymerization. For best results, it is preferred that no substituent group, other than alkoxy groups, be present in the benzene nucleus. It has been found that best results are obtained when the alkoxy group contains from 2 to 7 carbon atoms.

The catalysts of this invention may be prepared by any of the well-known methods for preparing peroxides; thus, the reaction of o-ethoxybenzoyl chloride and sodium peroxide produces o,o'-diethoxybenzoyl peroxide, a white crystalline solid. Although this peroxide and other peroxides of this invention are surprisingly stable materials and require no special precautions to preserve them if they are to be used soon after they are prepared, they are preferably stored at low temperatures. Among the compounds which have been found to be effective catalysts are o,o'-dimethoxybenzoyl peroxide, o,o'-diethoxybenzoyl peroxide, p,p'-diethoxybenzoyl peroxide, o,o'-di-n-propoxybenzoyl peroxide, o,o'-diisopropoxybenzoyl peroxide, p,p'-di-n-propoxybenzoyl peroxide, p,p'-diisopropoxybenzoyl peroxide, p,p'-diisobutoxybenzoyl peroxide, p,p'-di-n-hexyloxybenzoyl peroxide, p,p'-di-n-heptyloxybenzoyl peroxide, 2,4,2',4'-tetramethoxybenzoyl peroxide, 2,6,2',6'-tetramethoxybenzoyl peroxide, and the like. Asymmetrical peroxides, that is, those which do not contain the same substituent groups in both benzene nuclei of the benzoyl peroxide, such as the mono-substituted 2-ethoxybenzoyl benzoyl peroxide, may also be employed.

The catalysts of this invention are effective in amounts ranging from 0.05 up to 2% or more, based upon the weight of the monomeric materials. They may be used either alone or in conjunction with each other, or in conjunction with other catalysts. Any of the conventional buffers such as sodium bicarbonate, sodium acid phosphate or tartrate, lead acetate, or the like may be employed to maintain the hydrogen ion concentration substantially constant during the polymerization. There may be used any of the ordinary emulsifying agents such as gelatin, and soaps such as sodium oleate, potassium palmitate, sodium myristate, and rosin or dehydrogenated rosin soaps. There may also be used synthetic saponaceous materials such as hymolal sulfates and alkaryl sulfonates; for example, sodium lauryl sulfate and sodium isopropyl naphthalene sulfonate and salts of organic bases containing long carbon chains such as the hydrochloride of diethylaminoethyloleylamide, trimethylcetylammonium methyl sulfate, the hydrochloride of oleylamidoethyldimethylamine, and the like.

While the polymerization may be effected with these new catalysts in the presence of air, the rate of reaction is ordinarily faster in an inert atmosphere, that is, in the absence of oxygen. The particular temperature at which the polymerization reaction is carried out is not critical; it may be varied over a wide range from about room temperature up to about 60° C. or higher. Best results are usually obtained from about 40° to about 50° C.

As an indication of the superiority of these new catalysts, they were tested in the following recipe in which the parts are by weight:

| | |
|---|---|
| Vinyl chloride | 100 |
| Water | 250 |
| Nekal AEM (gelatin and sodium isopropyl naphthalene sulfonate) | 0.625 |
| Sodium bicarbonate | 0.625 |

The molecular activities of the catalysts were determined by heating the foregoing mixture at 50° C. for 40 hours in an atmosphere of air with varying amounts of catalysts. The number of molecular proportions of benzoyl peroxide required to produce a specified amount of polymer (90% of the theoretical yield) divided by the number of molecular proportions of the alkoxylbenzol peroxide required to produce the same yield under the same conditions is taken as the molecular activity of the catalyst. The results of representative examples are given in the following table:

| Catalyst | Molecular Activity |
|---|---|
| o,o'-Diethoxybenzoyl peroxide | 4.18 |
| p,p'-Diethoxybenzoyl peroxide | 1.54 |
| Benzoyl peroxide | 1.00 |

The great increase in activity produced by the introduction of an alkoxy group into the benzene nucleus or benzoyl peroxide is clearly apparent from these results. Similar results may be obtained with other alkoxy benzoyl peroxides.

Although we have herein disclosed specific embodiments of our invention, we do not intend to limit ourselves solely thereto, but to include all of the obvious variations and modifications falling within the spirit and scope of the appended claims.

We claim:

1. The method which comprises polymerizing in aqueous emulsion a monomeric material consisting predominantly of vinyl chloride in the presence of a bis(ortho-alkoxybenzoyl) peroxide containing no substituent groups other than alkoxy groups, as catalyst.

2. The method which comprises polymerizing in aqueous emulsion a polymerizable organic compound containing an ethylenic linkage in the grouping

in the presence, as catalyst, of a bis (ortho-alkoxybenzoyl) peroxide containing no substituent groups in the benzene ring other than alkoxy groups.

3. The method which comprises polymerizing in aqueous emulsion a monomeric material consisting predominantly of vinyl chloride in the presence of a bis(ortho-alkoxybenzoyl) peroxide in which the alkoxy group contains from 2 to 7 carbon atoms and which contains no substituent groups other than alkoxy groups, as catalyst.

4. The method which comprises polymerizing in aqueous emulsion a monomeric material consisting predominantly of vinyl chloride in the presence of a bis(ortho-alkoxybenzoyl) peroxide in which the alkoxy group contains from 2 to 7 carbon atoms and which contains no substituent groups other than alkoxy groups, and which contains no additional substituent groups in the benzene ring, as catalyst.

5. The method which comprises polymerizing in aqueous emulsion a monomeric material consisting predominantly of vinyl chloride in the presence of o,o'-diethoxybenzoyl peroxide as catalyst.

6. The method which comprises polymerizing vinyl chloride in aqueous emulsion in the presence of o,o'-diethoxybenzoyl peroxide as catalyst.

7. The method which comprises polymerizing in aqueous emulsion a monomeric material consisting predominantly of vinyl chloride in the presence of p,p'-diethoxybenzoyl peroxide as catalyst.

8. The method which comprises polymerizing vinyl chloride in aqueous emulsion in the presence of p,p'-diethoxybenzoyl peroxide as catalyst.

VERNON L. FOLT.
FORREST W. SHAVER.

REFERENCES CITED

The following references are of record in the file of this patent:

UNITED STATES PATENTS

| Number | Name | Date |
|---|---|---|
| 2,300,566 | Hahn et al. | Nov. 3, 1942 |
| 1,874,107 | Lawson et al. | Aug. 30, 1932 |

OTHER REFERENCES

Beilstein, Handbuch der Organischen Chemie, vol. 10, page 163 (1927).

Degering et al., "Outline of Organic Chemistry," pages 16–18, published by Barnes and Noble, N. Y., 1939, 3rd ed.